G. A. PARMENTER.

LIFE GUARD FOR STREET CARS.

No. 11,584. Reissued Jan. 12, 1897.

Witnesses:

Walter E. Lombard

George H. Brown,

Inventor:

George A. Parmenter, by N. C. Lombard,

Att'y.

UNITED STATES PATENT OFFICE.

GEORGE A. PARMENTER, OF CAMBRIDGE, MASSACHUSETTS.

LIFE-GUARD FOR STREET-CARS.

SPECIFICATION forming part of Reissued Letters Patent No. 11,584, dated January 12, 1897.

Original No. 558,659, dated April 21, 1896. Application for reissue filed December 3, 1896. Serial No. 614,388.

*To all whom it may concern:*

Be it known that I, GEORGE A. PARMENTER, a citizen of the United States, residing at Cambridge, in the county of Middlesex and State of Massachusetts, have invented a new and useful Improvement in Life-Guards for Street-Cars, of which the following is a specification.

My invention belongs to that class of life-guards generally known as "front fenders;" and it consists of a spring or yielding structure and a combination of parts by which it can be dropped onto the track at the will of the motorman, so as to pass under an object lying upon the road-bed.

Figure 1:
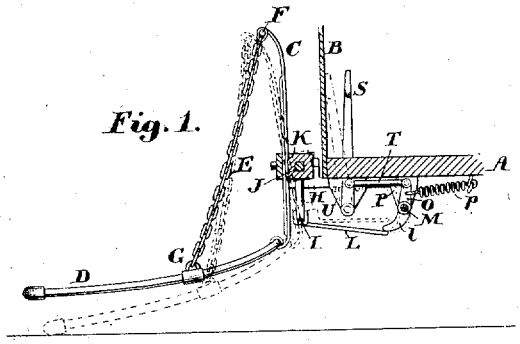
Figure 2:
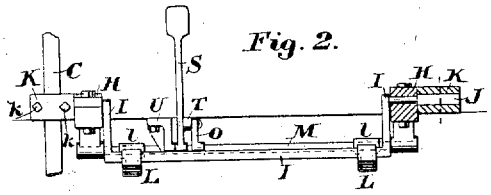
Figure 3:
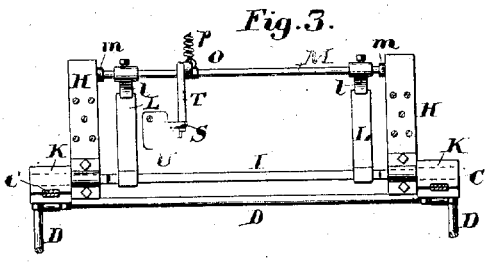

In the accompanying drawings, Figure 1 is a side view of my invention attached to the platform of a car, which is shown partly in section. Fig. 2 is a front view of a portion of the invention with some of the parts shown in section. Fig. 3 is a plan view of Fig. 2 as it would appear with the platform of the car removed.

A is the platform of a street-car, and B the dashboard.

C C are elliptic springs, to the lower ends of which is attached the shelf or scoop D, which is a frame covered with a screen or netting suitable to support a person and to prevent his leg or arm passing through it.

The front edge of the scoop D is suspended by chains or cords E from the loops or eyes F in the upper ends of the springs C, extending to the eyes G in the frame of the scoop.

Bolted to the under side of the platform are the hangers H H, in which is journaled the crank-shaft I, the ends of which extend outwardly beyond the journals and are made to fit square holes J in the blocks K, made in two parts, between which the springs C are clamped, the parts being held together by the bolts *k k*.

To the crank-shaft I is secured the horizontal arms L L, extending backwardly and engaging the lugs or trippers *l l*, secured to the rock-shaft M, which is journaled in bearings *m m* on hangers P, secured to the under side of the car.

To the upper side of the rock-shaft M is secured the arm O, which is normally pulled backward by the spring *p*.

S is a lever which extends through the platform of the car to about the level of the knee and has a broad and flat top, against which the knee of the motorman can be conveniently pressed. The lever S is pivoted to the hanger U, secured to the bottom of the car, and by means of the lever S, link T, and arm O the crank-shaft is oscillated and the trippers *l l* are withdrawn from contact with the arms L L, thereby permitting the front end of the scoop to drop to the ground into a position to slide under a person or other object lying upon the track.

The full lines of the lever S, link T, arm O, and other parts show their positions when the fender is in its ordinary and normal position, at which time a person standing upon the track would be struck and caught in the fender. The dotted lines show the positions of those parts when the fender is dropped so as to catch a body which has fallen upon the ground. The yielding feature of the device is of the utmost importance in either case, to avoid shocks to the car and breaking of the fender, to ride over the irregularities of the ground, and to make the fender hug closely to the surface of the road-bed.

When the fender is not in use, it may be turned up against the dashboard of the car and secured by a hook or other suitable means.

I am aware that front fenders have been attached to cars by means of springs, but were not so arranged that they could be dropped, and also that front fenders have been made which can be dropped by the motorman, but which were rigidly secured to the car. In my invention the construction of the springs and their means of attachment to the car differ from those in any fenders heretofore devised, and the combination of parts by which the fender is dropped differs from any prior mechanism for that purpose, whereby I am able to combine in one machine the features of a spring or yielding attachment to the car and a dropping device. It will also be noticed that my fender is not in any manner attached to the dashboard, but is supported wholly by the body of the car, which is a feature of great practical value.

What I have invented, and desire to secure by Letters Patent, is—

1. In a car-fender or life-guard, the combination of a crank-shaft mounted in suitable bearings attached to the body of the car;

a pair of elliptical springs secured to said shaft and projecting above and below said shaft with both the upper and lower ends thereof free to yield; a scoop pivoted to the lower ends of said springs and suspended from the top ends thereof; a lever rigidly connected to said crank-shaft and extending backwardly therefrom; a locking arm or tumbler to engage the free or movable end of said lever to lock said scoop in raised position; and means for tripping said locking arm or tumbler to permit said scoop to drop to the track.

2. The combination of the scoop D, two elliptical springs C, C, secured in a vertical position, and having their upper and lower ends free to yield, said scoop being pivoted to the lower ends of said springs, and suspended from the upper ends of said springs by suitable connections, the blocks K, K, secured to said springs C, C, and fixed to the crank-shaft I, the crank-shaft I, journaled in the hangers H, H, one or more horizontal arms L, rigidly secured to the crank-shaft I, and extending backwardly therefrom, the rock-shaft M, having one or more trippers *l*, secured thereto and engaging the arm L, the arm O, and lever S, connected by the link T, arranged as shown for releasing the arm L, substantially as described.

In testimony whereof I have signed my name to this specification, in the presence of two subscribing witnesses, on this 28th day of November, A. D. 1896.

GEO. A. PARMENTER.

Witnessess:

N. C. LOMBARD,

WALTER E. LOMBARD.